United States Patent [19]

Higginbotham

[11] Patent Number: 5,332,248
[45] Date of Patent: Jul. 26, 1994

[54] HITCH FOR TOWING A TRAILER

[76] Inventor: T. Pat Higginbotham, 6465 County Rd. 20, Orland, Calif. 95963

[21] Appl. No.: 64,594

[22] Filed: May 21, 1993

[51] Int. Cl.$^5$ .............................. B60P 1/00; B60P 3/00; B60P 3/12
[52] U.S. Cl. .................................. 280/402; 280/425.2; 280/441.2; 414/563
[58] Field of Search .................... 250/477, 417.1, 425.1, 250/425.2, 441.1, 441.2, 490.1, 498, 479.2, 402; 414/563, 719, 673

[56] References Cited

U.S. PATENT DOCUMENTS 4,664,585  5/1987  Ambridge et al. .................. 280/402
4,946,182  8/1990  Weber ................................ 280/402

Primary Examiner—Mitchell J. Hill

[57] ABSTRACT

A power operated hitch with hitch ball for towing a large trailer, and having an electrically powered hydraulic fluid pumping system and multiple hydraulic rams on a main support frame of the hitch which mounts to the top of the back frame section of a transport truck. The hitch includes an L-shaped main boom which is telescopic, with the telescopic portion generally lengthwise horizontally disposed above the truck frame. The hitch ball is attached to a bottom end of a vertically disposed downward extension of the distal end of the boom. The main boom is pivotally supported by a main spherical bearing; a horizontal main support shaft through the spherical bearing; and a horizontal support arm affixed to one side of the boom and slidably retained at the distal end thereof in a channel connected to the hitch main frame. Through use of the multiple rams and articulating joints, the hitch includes movement capabilities for vertical, lateral, and extension and retraction of the hitch ball relative to the back of the truck. A semi-automatic lock is provided for mechanically locking the boom and hitch ball stationary for normal towing of a trailer.

9 Claims, 12 Drawing Sheets

HITCH FOR TOWING A TRAILER

BACKGROUND OF THE INVENTION

1. Field of the Invention

This invention relates to towing hitches having powered hitch ball movement capabilities and which are mounted on large transport trucks for towing trailers. The present invention is a hitch which is particularly structured to be useful in towing and positioning long, heavy trailers such as mobile homes and the like.

2. Description of the prior art

Although there have been a variety of prior art hitch structures attachable to large trucks for towing trailers, and many of these have included articulating joints and powered extendable actuators for moving the hitch ball and thus the trailer independent of the position of the truck, all of the prior art hitches have shortcomings, particularly when towing long and heavy trailers such as mobile homes over narrow winding roads. Some of the prior art hitches only include capabilities providing for limited movement such as vertical adjustment, while not providing for lateral movement of the hitch ball. Other prior art hitches include capabilities for vertical and lateral movement of the hitch ball. Some prior art hitches have been provided with vertical, lateral, and extending and retracting movement capabilities of the hitch ball relative to the truck, but of the hitches which provide for these three desirable movements of the hitch ball, none are believed to be as safe and as convenient to operate, and none are structured in the same manner or offer all of the useful benefits of the present powered hitch. Prior art trailer hitches which do include the three desirable movements of the hitch ball do not provide these movements in wide enough movement ranges to allow the towing of very long trailers over winding mountain roads, nor are these prior art hitches shaped and structured in a manner which would allow them to be readily or inexpensively modified to provide for wider movement ranges and still provide sufficient strength to tow a very long and heavy trailer such as a mobile home. Therefore there is a need for an improved hitch for towing a long heavy trailers.

SUMMARY OF THE INVENTION

The present invention is a power operated hitch which easily mounts on top of the back frame of a transport truck for towing trailers such as mobile homes and the like. The present hitch is structured to be extremely strong and durable, yet relatively lightweight and inexpensive to manufacture and thus sell. The present hitch includes powered movement capabilities utilizing powered actuators for vertical, lateral, and extension and retraction of the hitch ball relative to the truck, with these movements provided in wide ranges wherein the lateral extreme movements allow swinging the hitch ball approximately five feet, and the vertical adjustability allows for raising the ball to over four feet off the ground, to lowering the ball to be essentially resting on the ground. A low profile L-shaped telescopic main boom of the hitch which carries the hitch ball is retractable and extendable towards and away from the rear of the truck by approximately four feet. The movements can be independent of one another, or combined so as to allow simultaneous vertical, lateral and extending or retracting movements to occur at once and thereby the operator is provided with significant ability to carefully move the trailer relative to the rear end of the truck.

The present hitch is particularly useful in towing heavy and very long trailers, and in positioning the trailers in tight locations. With the present hitch, it is possible through the use of the powered movements of the hitch to negotiate a long trailer through and around very sharp corners, dips and rises in the road. The easily controlled powered movement of the present hitch allows the truck to remain stationary or move very slowly at sharp bends in the road, and by swinging the hitch sideways, up or down, or inward and outward, the front end of the trailer may be repositioned relative to the truck and road. The repositioning of the front end of the trailer of course results in the repositioning of the rear end of the trailer relative to the truck and relative to the road, and this repositioning of the trailer relative to the road allows for the negotiating of the trailer through and around much sharper corners than would be allowed with a hitch ball which was affixed stationary relative to the back end of the truck, or a hitch which had substantially less range of movement potential for the hitch ball. The movement capabilities of the present hitch also allow for relatively quick and accurate placement of the trailer at the delivery site, and this is particularly true with double and triple wide mobile homes which often need to be placed on small lots in trailer parks and in side abutment with the mating sections. The ability to move the hitch ball while slowing moving the truck is also a substantial advantage offered by the present invention.

Dual control stations for moving the hitch ball are provided, with one station being toward the rear side of the truck so as to allow the operator to stand in a safe yet good viewing position as he controls movement in the hitch, and the second station of controls are mounted in the cab of the truck so the operator may remain in the cab and control movement in the hitch while also moving or carefully positioning the truck.

A semi-automatic lock is provided for mechanically locking the boom and hitch ball stationary for normal towing of a trailer along a highway where movement of the hitch ball is not necessary. The lock is held in the locked position with an extension spring, and can only be unlocked through using a power lifting ram or the like, and thereby the lock cannot disengage the trailer upon loss of hydraulic, pneumatic or electrical power.

A primary object of the present invention is to provide an improved power operated hitch for a transport truck for towing long trailers such as mobile homes and the like.

A further object of the invention is to provide the above in a hitch which is relatively quick and easy to mount by bolting to the top of the existing rearward end of the truck frame preferably without having to significantly alter the truck frame.

A further object of the invention is to provide the above in a hitch which provides powered movement capabilities for vertical, lateral, and extension and retraction of the hitch ball relative to the truck, with these movements provided with wide ranges of motion.

A further object of the invention is to provide the above in a hitch in which the movements can be easily obtained independent of one another so as to allow vertical movements independent of lateral movements, and extending and retracting movements independent of vertical or lateral movement.

A further object of the invention is to provide the above in a hitch in which the movements can be combined if desired so as to allow angular simultaneous vertical, lateral and extending or retracting movements to occur at once and thereby the operator is provided with significant ability to precisely move the trailer relative to the rear end of the truck.

A further object of the invention is to provide the above in a hitch in which the hitch ball mount remains relatively horizontally disposed through a wide range of movements of the hitch ball, and thereby the need to stop and re-align the ball mount with extreme movements is eliminated.

A further object of the invention is to provide the above in a hitch which includes a lock structured for mechanically locking the boom and hitch ball stationary, wherein the lock is held in the locked position with a spring, and can only be unlocked through using a lifting ram or similar powered device so that the lock cannot disengage upon loss of hydraulic, pneumatic or electrical power.

A further object of the invention is to provide the above in a hitch in which the safety chain and electrical cable for the trailer brakes and lights are attached on the hitch ball carrying portion of the boom, and move with the boom and hitch ball so that once the safety chain and electrical cable are affixed to the trailer at the correct length, the length need not be adjusted again regardless of the position of the boom, with this being a significant feature with a hitch having such wide ranges of movement potential for the hitch ball.

A further object of the invention is to provide the above in a hitch which preferably includes dual movement control stations with one station being toward the rear of the truck, and the second station mounted in the cab of the truck.

A further object of the invention is to provide the above in a hitch which is shaped and otherwise structured to be extremely strong and durable, yet relatively lightweight and inexpensive to manufacture and thus sell or purchase.

These as well as other objects and advantages of the present invention will become more apparent and appreciated with continued reading of the specification and claims along with an examination of the drawings.

DESCRIPTION OF A PREFERRED EMBODIMENT

Figure 1:
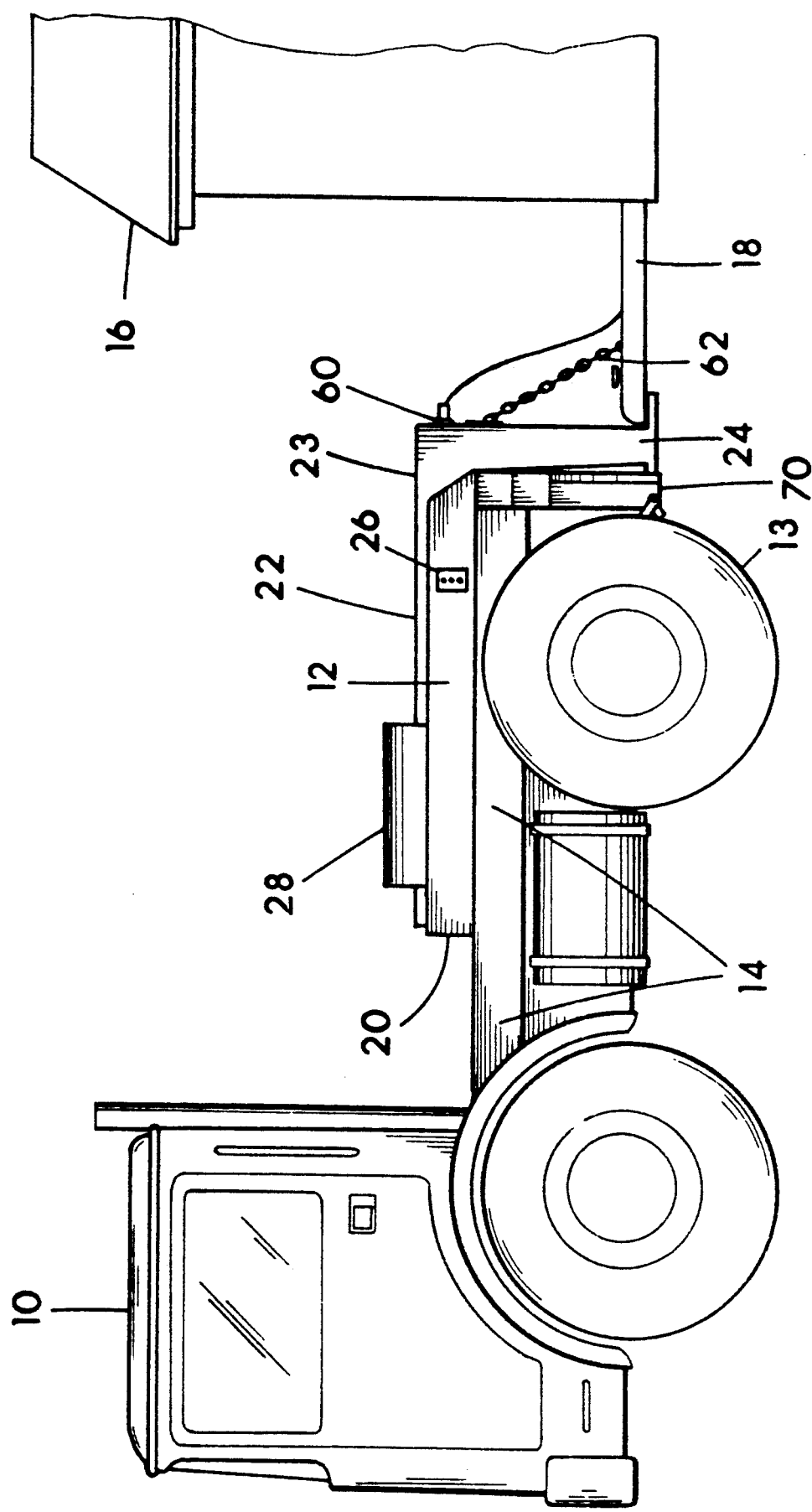
FIG. 1 shows a structural embodiment of my hitch attached to the back end of a transport truck and towing a trailer.

Referring now to the drawing figures for a detailed description of a preferred embodiment of hitch 12 for towing a trailer. The following description is given for example for those skilled in the art so that they may readily understand how to build and use at least one structural embodiment of the invention without having to resort to undue experimentation. The detailed description and drawings are not meant to limit the true scope of the invention to the precise details given, as recognize as will those skilled in the art that modifications may be made to certain specific details without departing from the true scope of the invention.

FIG. 1 shows a structural embodiment of hitch 12 attached to the back end of a transport truck 10 and towing a trailer 16. Since hitch 12 is designed to carry relative heavy loads, most all of the structural parts of the hitch 12 are preferably fabricated of steel. Hitch 12 includes a superstructure or main hitch frame 20 which is structured (shaped and sized) to rest on top of the rear frame 14 section of the truck 10 wherein the hitch frame 20 bolts to the truck frame 14. This arrangement of resting the hitch frame 20 on the top rear end of the truck frame 14 is one which allows hitch 12 to quickly attach to a transport truck 10 without time consuming, expensive and possibly structurally weakening alterations having to be made to the truck 10. The bolting together of the two frames 14 and 20 is preferred as this allows the quick attachment and removal of the hitch 12 from the truck 10. Hitch 12 is preferably approximately centered between the rear wheel 13 of the truck 10.

Figure 2:
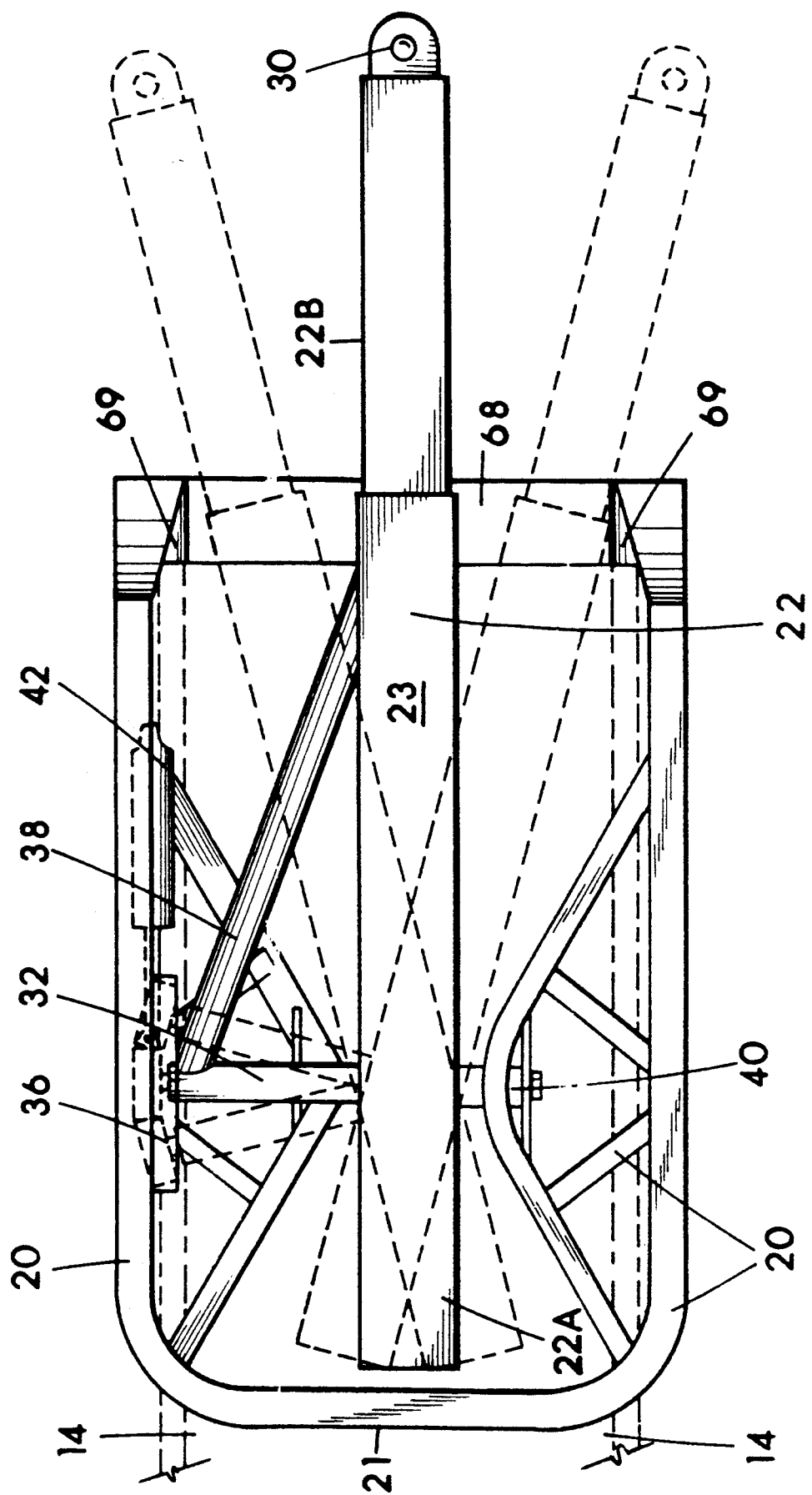
FIG. 2 is a top view of my hitch primarily to show the left and right lateral movement capabilities of the hitch boom. For the sake of clarity of that which is shown, some features of the hitch have been left out of this figure.
Figure 6:
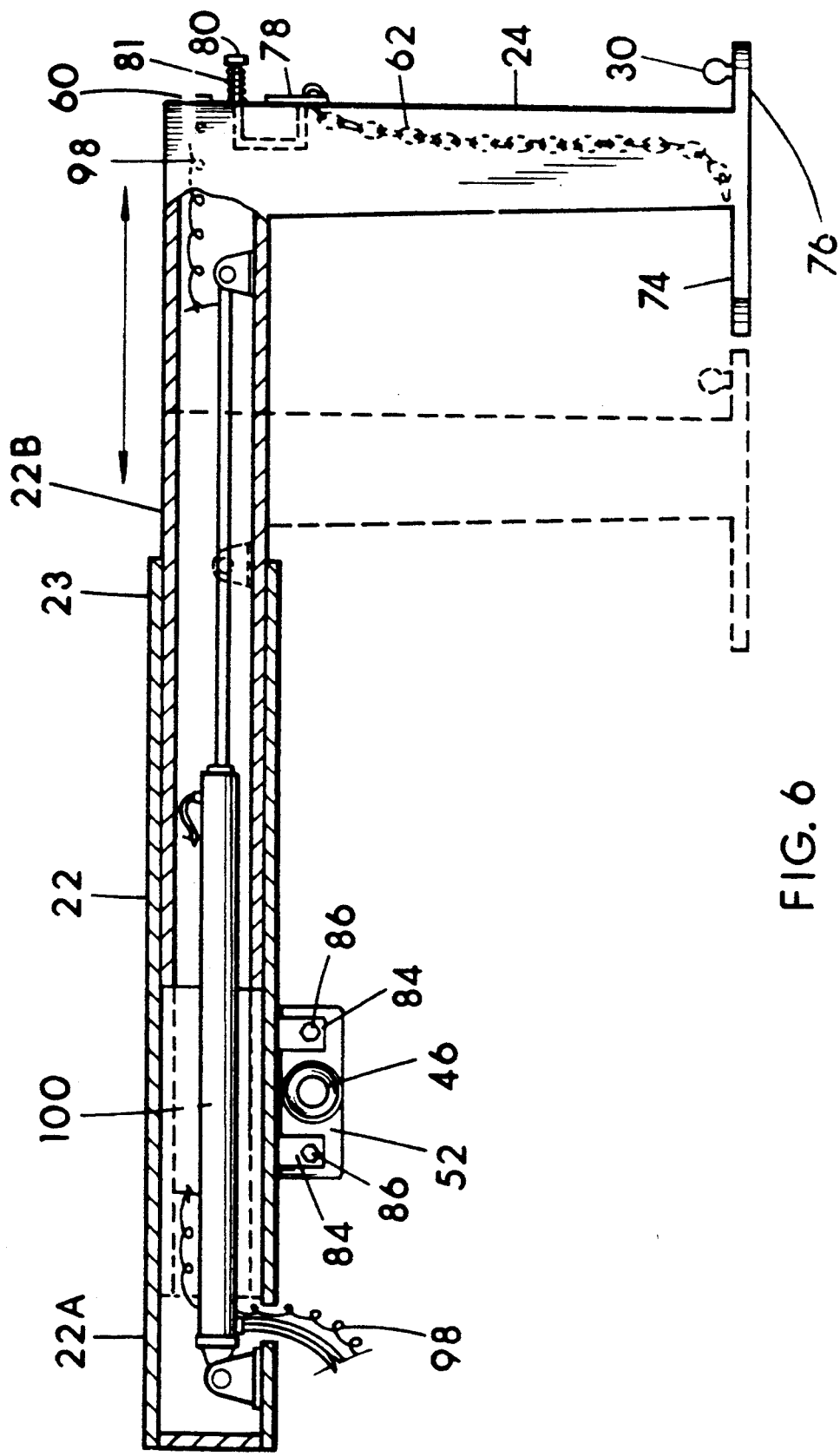
FIG. 6 is a partial cross-sectional side view of the telescopic hitch boom with the downward extension having the hitch ball.

The main hitch frame 20 supports the low profile main hitch boom 23. As may be seen in the drawings, boom 23 is generally L-shaped, with this shape allowing for the elongated horizontal portion of the boom to be maintained in close proximity to the truck frame 14 and slightly above the truck frame 14 while at the same time allowing for the placement of the hitch ball 30 to be positioned downward below the truck frame at normal trailer hitch height. The L-shape of the boom 23 with the horizontal portion 22 thereof being affixed in close proximity to the main frame 20 of the hitch 12 and the frame 14 of the truck is a shape which is sturdy and maintains a relatively straight pull to the main bearing mount of the boom which is in close proximity to the main frame 20 mounted to the top of the truck frame 14. Boom 23 includes a hollow elongated telescopic boom section 22 having an outer section 22 A positioned more toward the truck cab, and an inner section 22 B slidably within 22 A (FIGS. 2 and 6). The telescopic boom section 22 normally rests horizontally disposed when in the locked position, but can pivot upward and downward to raise and lower hitch ball 30. Boom 23 also includes a downward extension 24 attached at the distal end of the boom section 22 B and extending vertically downward below the truck frame 14 toward the ground. A distal and downward end of the downward extension 24 has the attached hitch ball 30. The horizontal boom section 22 is normally supported upward above the truck frame 14 which is a relatively high elevation, and the downward extension 24 supports the hitch ball 30 at a relatively low elevation outward beyond the rear end of the truck 10, and this arrangement allows for the placement and locking of the hitch ball 30 at a height during normal towing which is commensurate with average trailer hitch arm 18 heights as may be seen in FIG. 1. The high telescopic boom section 22 in conjunction with the low hitch ball 30 is one aspect of the hitch which allows for wide ranges of movement in the hitch ball 30. Also shown in FIG. 1 is a boom movement control station 26 at the rear side of the frame 20, which is a good place for an operator to stand to one side and control movement of the hitch ball via movement of boom 23, while being able to see downward extension 24. Also shown in FIG. 1 is an electrical socket or outlet 60 at about the juncture of the section 22 B with section 24 of the boom 23, and feeding electrical power via a plug and cord to the trailer 16 brakes and lights. A safety chain 62 is also exiting the downward extension 24 and connecting to the trailer hitch arm 18. A safety shroud or cover 28 is also shown. Further details on the controls 26, the electrical outlet 60, chain 62 and cover 28 will be given further on in the description.

FIG. 2 is a top view of hitch 12 primarily to show the left and right lateral movement capabilities of the hitch boom 23. The boom section 22 is shown mounted centrally relative to the width across main frame 20, and this allows for equal left and right lateral swings of the boom 23 as may be ascertained from the drawing. The boom section 22 should also be centered between the rear wheel 13 and truck frame 14. The normal position of the truck frame 14 members may also be seen underneath the front frame cross member 21 of the hitch and extending into and terminating within receiving pockets 69 (box-like structures) of my frame 20 at the rear end of the truck. Each of the two spaced apart receiving pockets 69 having vertical and horizontal plates are above the hitch frame cross member 68, and connect by welding, cross member 68 to the balance of frame 20 of the hitch 12. The top plates of receiving pockets 69 rest on top of the terminal ends of the truck frame members 14 which extend into the pockets 69, where the top plates of the pockets 69 are secured with bolts to the truck frame members 14. The position of the two receiving pockets 69 may also be seen in FIG. 4. In FIG. 2, it can be seen that main frame 20 is generally U-shaped at the end with front cross member 21, as the outer main member of frame 20 is preferably made of channel iron which is bent at the intersections of cross member 21 with the lengthwise frame side rails. Main frame 20 also includes various angled members, braces and brackets which both add overall strength and rigidity, and locations to which other components of my hitch attach.

Referring now mainly to FIGS. 2 through 7 for a description of the pivotal attachment of the hitch boom 23 to main frame 20. Boom 23 is attached to main frame 20 with the use of a main spherical bearing 46 which is attached in an opening in a flat rectangular plate 52. The spherical bearing 46 is a commercially available bearing which includes an outer annular bearing housing and a ball-like center structure with central hole and which can swivel and rotate similar to a ball and socket joint within the bearing housing. The housing of bearing 46 is removably attached within a hole in a plate 52. Passing through the center hole of bearing 46 is a main support shaft 40. Shaft 40 is round bar stock of high strength, preferably a 2" diameter rod made of high quality steel. Each end of shaft 40 is attached to bracket members of main frame 20 preferably with a bolt 48 at one end of the shaft 40, and at the opposite end with a nut 50 so that the shaft 40 may be removed when desired. Shaft 40 need not be rotatable as bearing 46 and thus plate 52 are rotatable on shaft 40. Two tubular sleeves 44 are placed over shaft 40 on each side of bearing 46 and span between bearing 46 and the members of frame 20 to which shaft 40 attaches, and thereby bearing 46 is maintained centered and prevented from sliding toward one side or the other of the main frame 20. The end of each sleeve 44 which abuts the center portion of bearing 46 is tapered or cut-back on the end shown at 45, so as to allow the plate 52 and the housing of bearing 46 to swing or angle as boom 23 swings on bearing 46 without being obstructed by the sleeve 44 end. The two outer most sleeves 44 toward the two opposite ends of shaft 40 are welded to members of frame 20 to supply strength to the attachment of shaft 40, as shaft 40 as well as spherical bearing 46 can have very high loads applied during normal usage. The reason for two sleeves 44 on each side of bearing 46 is primarily for ease of replacement, assembly and disassembly. Plate 52 attaches to the bottom rearward proximal cab end of the horizontal section 22 of boom 23, and specifically outer section 22 A. The plate 52, and thus bearing 46 is attached in the center of the lengthwise axis of section 22 A. Plate 52 attaches to boom 23 by way of extending tabs 84 welded to the bottom of the boom, and nuts and bolts 86 being used to bolt through apertures in the tabs 84 and through plate 52 to secure the members together as may be ascertained from FIGS. 5 and 6. The specific distance back from the end of boom section 22 A at which bearing 46 is attached is determined by the maximum length of the telescopic boom section 22, and taking into account the height of cross member 68, and whether it is desired to be able to extend section 22 outward and downward at an angle to essentially rest hitch ball 30 on the ground. It is desirable to be able to essentially rest hitch ball 30 on the ground under some circumstances, and the placing the bearing 46 more toward one end or the other of section 22 will determine whether the ground can be reached without the boom section 22 hitting cross member 68.

Figure 3:
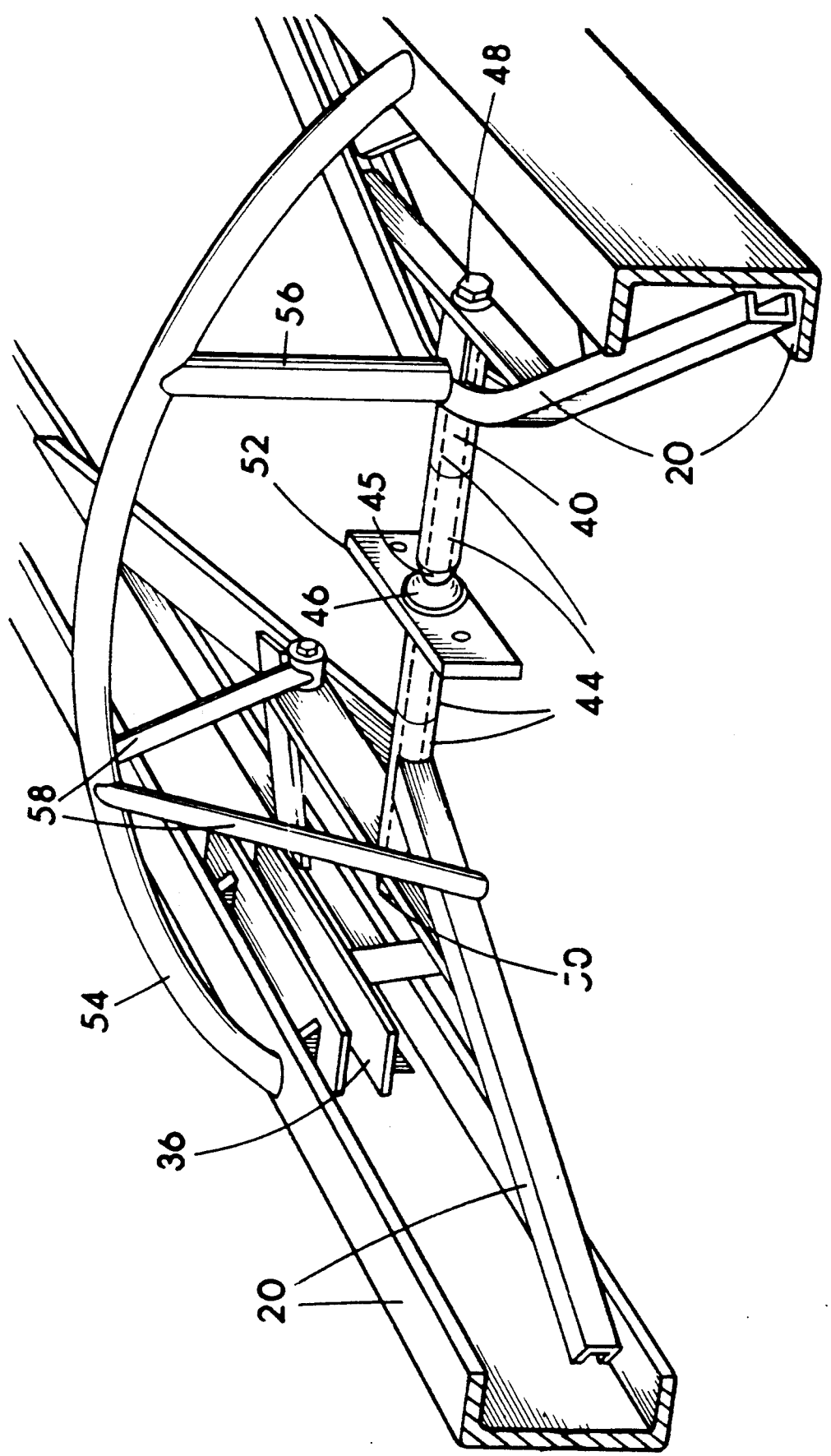
FIG. 3 is a partial cross-sectional view of my hitch as it would appear looking from the cab end of a truck toward the rear of the truck. Again, for the sake of clarity of that which is shown, some features of the hitch, such as the boom, support arm and hydraulic pump for example, have been left out of this figure.

A bent or curved cross brace 54 may be seen in FIG. 3 affixed to each opposite side rail of frame 20. The brace 54 is positioned over boom 23, and centered over shaft 40 and bearing 46. Brace 54 adds strength and rigidity to frame 20, and additionally allows the application of a vertical brace 56 downward onto the members of frame 20 at the location at which shaft 40 is attached with bolt 48. Extending from brace 54, across from brace 56, are two vertically inclined braces 58 which attach to members of frame 20 in the area of the attachment of that end of shaft 40 with nut 50. The two braces 58 are in angled spaced relationship in order to provide space between the two braces 58 for support arm 32 which moves horizontally with left and right lateral movement of boom 23, and which will be explained later. However, in order to easily remove boom 23 with the attached support arm 32, at least one of the braces 58 should be bolted in place or otherwise removably attached, and preferably the brace 58 nearest hitch ball 30. The other brace 58 as well as braces 54 and 56 may be welded in place.

Figure 4:
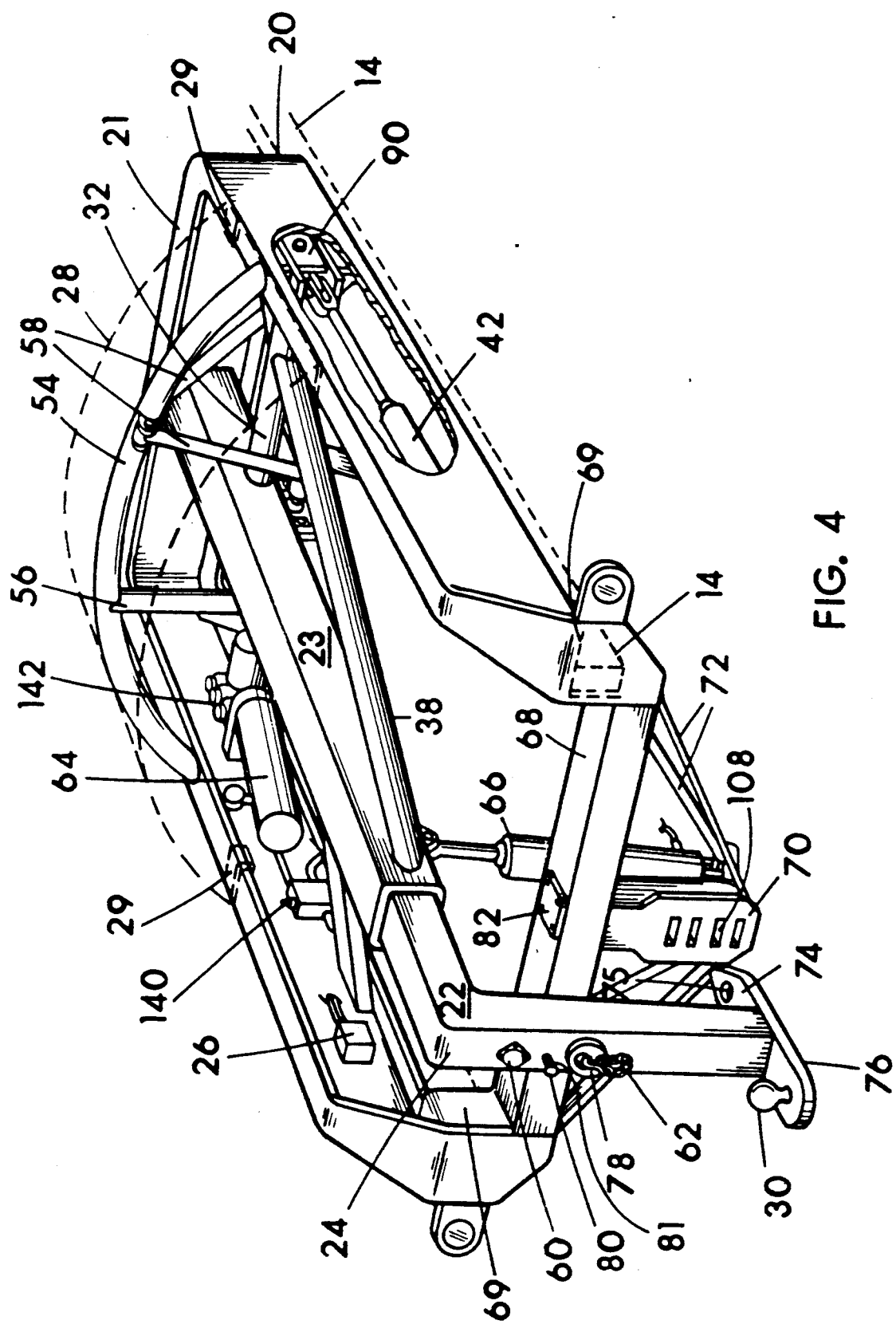
FIG. 4 is a perspective view from the rear of my hitch and showing the L-shaped boom attached to the hitch main frame.
Figure 5:
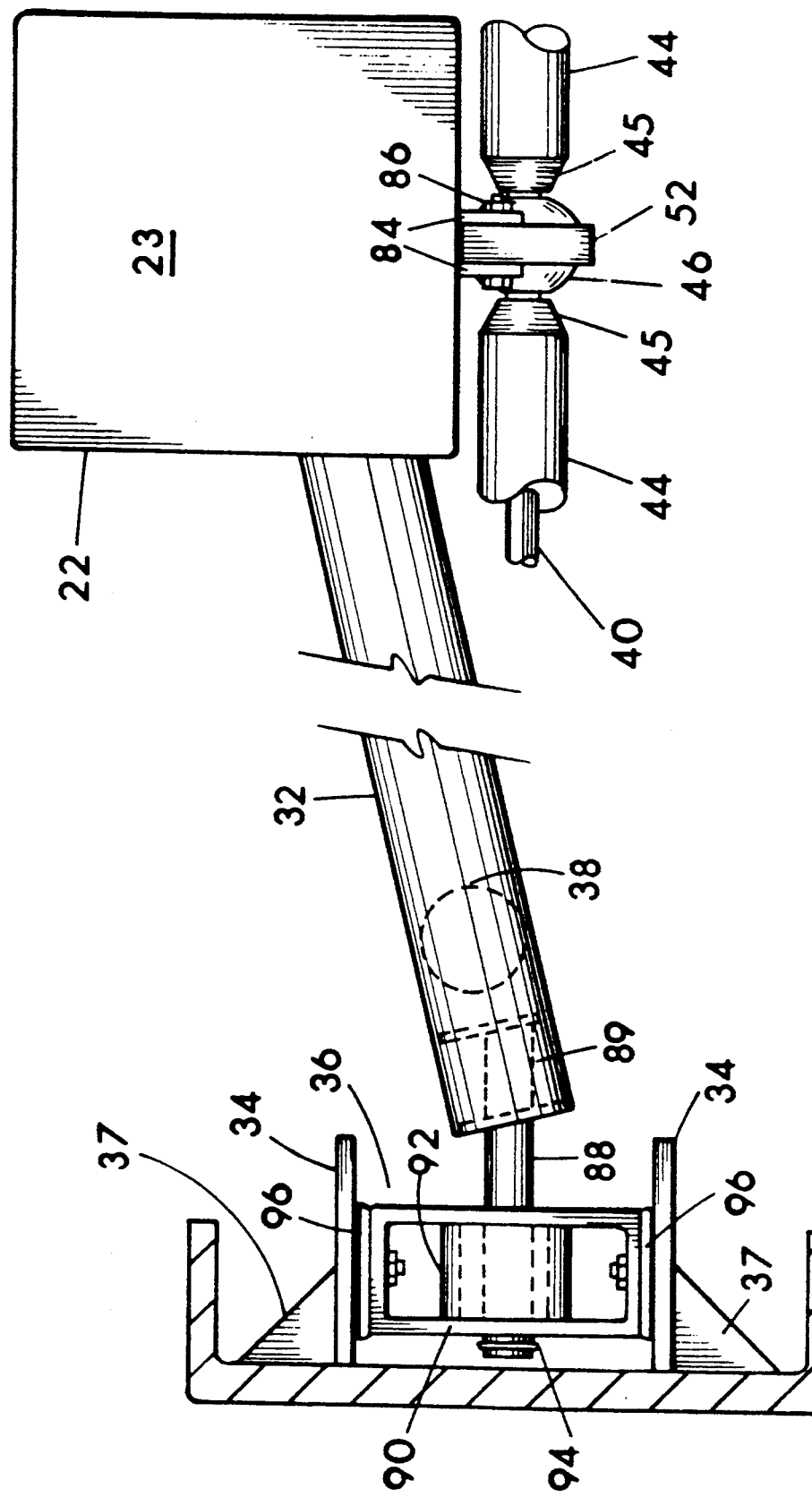
FIG. 5 is a partial view of my hitch showing the end of the boom toward the truck cab, with the support arm extending perpendicularly from the boom, and the distal end of the support arm retained within a channel on the main hitch frame.

Additionally supporting and adding strength, rigidity and yet still allowing vertical and lateral movement in boom 23 is support arm 32 shown in FIGS. 2, 4 and 5. A first portion of support arm 32 in this example is round pipe welded to the side of boom section 22. Support arm 32 is attached to the telescopic section 22 A (outer section) of boom 23 directly above bearing 46 and to one side edge of the boom 23. Support arm 32 extends perpendicularly outward, and slightly downward at about a 15 degree angle from section 22 A toward channel 36 attached to main frame 20. Channel 36 shown well in FIGS. 3 and 5, includes a top and bottom plate 34 spaced from one another and attached to frame 20 and gusseted at 37. The ends of channel 36 are left opened. Support arm 32 is attached above bearing 46 and as close as is reasonably possible to bearing 46 (in the area). The reason for attaching support arm 32 in the immediate area of bearing 46 is that when boom section 22 angles upward or downward vertically, the boom will be pivoting on bearing 46, and the closer to the center of bearing 46 support arm 32 is positioned, the less vertical angular change occurs in the arm 32. Little to no vertical angular change is desired in support arm 32, at least at its distal end, and this may in-part be achieved by attaching it close to bearing 46. When boom section 22 angles upward or downward vertically, the boom will be pivoting on bearing 46, and this theoretically translates into rotational movement in the center of the bearing 46. Likewise, vertical angular changes in the boom section 22 apply some rotational movement to support arm 32. In the example of the invention in this disclosure, because support arm 32 is not perfectly centered with bearing 46, there will be a small amount of vertical movement in support arm 32, however, this will not effect the tight yet horizontal sliding fit of the shoe 90 at the distal end of the support arm 32 within channel 36, nor will it effect the intended purpose of the arm 32, provided the distal end of the support arm 32 within channel 36 does not move up and down. In order to prevent the distal end of arm 32 from moving up and down as the boom 23 swings up and down, a shaft 88 is attached at an angle equal to the angle (about 15 degrees) which the arm 32 is attached to the boom as best shown in FIG. 5. Shaft 88 is angled in the opposite direction so as to rest horizontally when boom section 22 is horizontally disposed. The round pipe of support arm 32 terminates shortly before channel 36 and the transitional shaft 88 is affixed and welded in place at 89 within the round pipe and extends outward into channel 36. A hollow box-like shoe 90 made of steel and having a central transverse bore is applied to the end of shaft 88 and retained in place with a c-ring retainer 94 or the like. The top and bottom surfaces of shoe 90 may have an affixed slick bearing surface such as a self-lubricating plastic sheeting 96 attached thereto to provide for smoother sliding of the shoe 90 within the channel 36. A bearing 92 is affixed in place within the hollow center of shoe 90 and over shaft 88. Shaft 88 may rotate within bearing 92 and the transverse hole through shoe 90, and this provides an arrangement which allows support arm 32 and shaft 88 to rotate with vertical angular changes in boom 23 without these rotational forces being applied to shoe 90. This arrangement also allows the longer angularly attached round pipe portion of support arm 32 to move up and down somewhat, without the up and down movement being carried into shaft 88, as shaft 88 may rotate, but it will remain horizontal and in the same plane when properly off-set in angle relative to the angle of the round pipe portion of support arm 32.

Support arm 32 swings forward and rearward horizontally with shoe 90 within channel 36 with lateral swinging of boom 23. Shoe 90 is sized to fit tightly yet slidably within channel 36. Without support arm 32, or some equivalent thereof, boom section 22 would tip sideways somewhat, due to spherical bearing 46 allowing such undesirable tipping. Channel 36, shoe 90, and arm 32 add greatly to the overall strength and stability of the boom mounting by preventing sideways tipping of the boom on spherical bearing 46, while still allowing the boom 23 to swing up and down, and left and right. Shoe 90 distributes the loads over a wider area against channel 36 for increased stability and durability, and shoe 90 and shaft 88 from one view point may be considered part of the distal end, or the distal end itself of support arm 32.

An angled brace 38 is welded to and between support arm 32 and boom section 22 A to triangulate and thus add strength and stability to boom section 22 and support arm 32 shown best in FIGS. 2 and 4. Additionally in FIG. 4 it can be seen that support arm 32 passes between the two vertically inclined braces 58, and that the removable brace 58 located more toward hitch ball 30 is in-board of brace 38, and therefore clearances must be provided to allow the desirable left and right lateral swinging of boom 23.

The left and right lateral swinging of boom 23 in this example is provided by a double acting hydraulic ram (push cylinder) 42 shown in FIGS. 2 and 4. In all cases, the hydraulic rams on my hitch could be replaced with numerous other powered devices such as electric or hydraulic motors with gears and sprockets or chains, or pneumatic or hydraulic extendable actuators of various types, however, standard hydraulic rams are what I prefer for reasons of function and economy among other reasons. Ram 42 is attached at one end to frame 20 to hitch ball 30, and at the opposite end to shoe 90. Both ends of the ram 42 are of course pivotally attached since angle changes will occur as the ram 42 pushes shoe 90 and thus support arm 32 toward frame cross member 21 which results in moving boom 23 and thus hitch ball 30 in one lateral direction, and small angle changes will occur as ram 94 retracts drawing shoe 90 and thus support arm 32 toward hitch ball 30 which results in boom 23 and hitch ball 30 moving in the other lateral direction as may be ascertained from FIG. 2.

The boom 23, as briefly discussed above, generally comprises the elongated telescopic boom section 22 having the outer section 22 A more toward the truck cab and an inner section 22 B slidably within 22 A (FIGS. 2, 4 and 6). Both sections 22 A and B are preferably made of square or rectangular steel. A slick bearing surface such as a self-lubricating plastic sheeting (not shown) is preferably attached within the interior of outer section 22 A to provide for smoother sliding and less wear between the two section 22 A and 22 B. Boom section 22 A is an elongated square tube into which is slidably fitted the smaller elongated square tube 22 B. Section 22 B is sized relative to section 22 A to prevent the spinning of section 22 B with section 22 A. Attached within horizontal section 22 is a double acting hydraulic ram 100 shown in FIG. 6. One end of ram 100 is attached to and within section 22 A, and the opposite end of the ram 100 is attached to and within section 22 B. The end of ram 100 within section 22 A is raised somewhat with a stand-off mount so that section 22 B can sliding inward and outward around the ram 100. The hydraulic fluid lines for ram 100 exit section 22 A through an opening and connect to a hydraulic fluid pumping station 64 which will be described later. As those skilled in the art will recognize, the extension and retraction of ram 100 extends and retracts section 22 of boom 23 respectively, and thus extends and retracts hitch ball 30 relative to the rear end of the truck 10 or hitch frame 20.

Also shown in FIG. 6 is electrical conductor set 98 entering boom section 22 next to the hydraulic lines for ram 100. The coiled and extendable line 98 which is similar to a telephone receiver cord, extends through section 22 and connects to electrical socket 60 attached to boom 23 at about the junction of downward extension 24 to horizontal section 22. Socket 60 is a standard socket arranged to accept a standard trailer power plug on a cord for feeding electrical power to the brakes and lights of the trailer 16. Electrical conductor set 98 after exiting boom 23 connects to the proper wiring which is available on transport trucks for this purpose. The position of socket 60 at the end of the boom 23 adjacent to and movable with hitch ball 30 as discussed earlier, eliminates the need to continuously adjust the length of the brake and light cord of the trailer 16 as the hitch ball 30 is repositioned.

Figure 11:
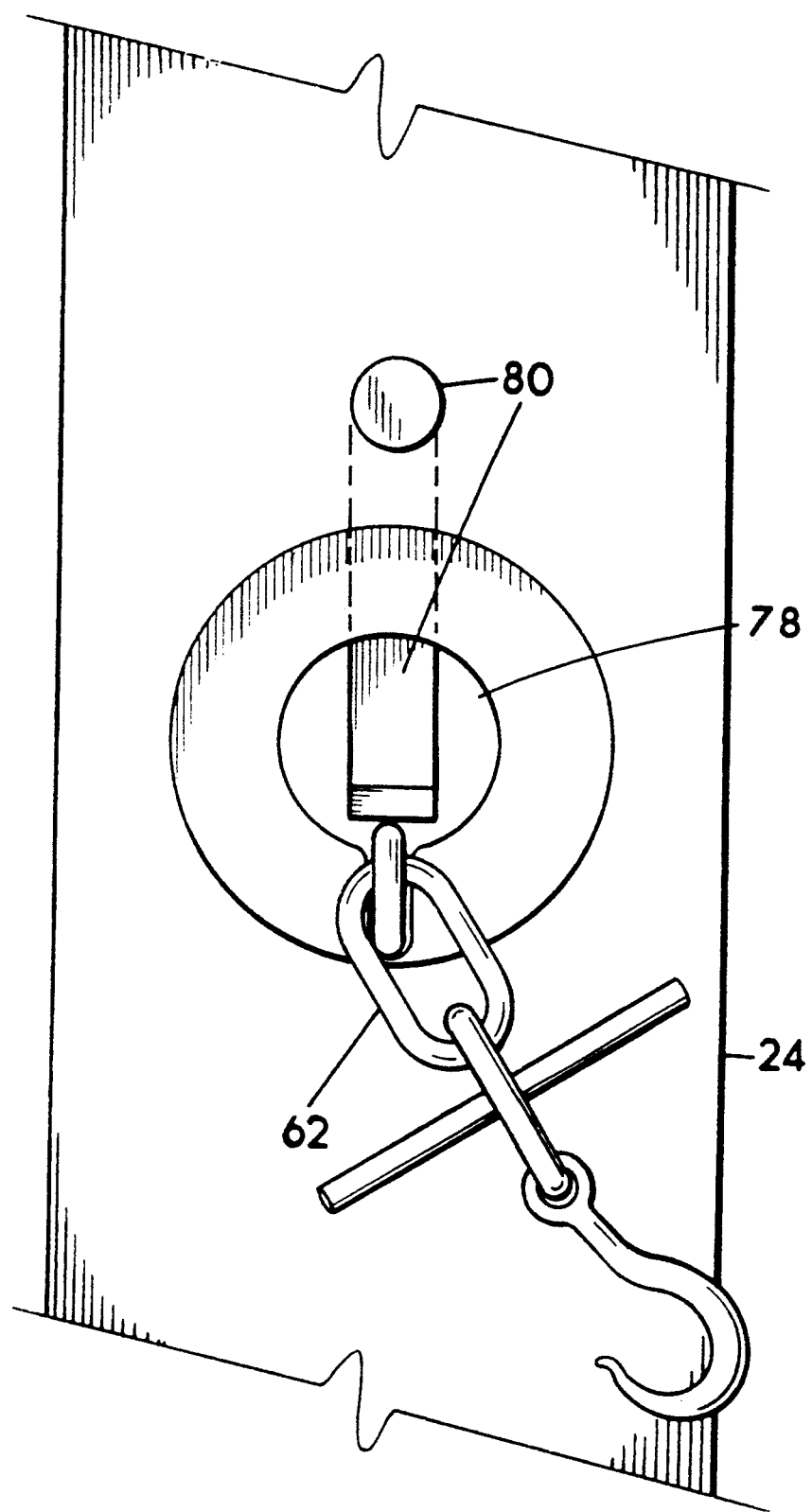
FIG. 11 is a view of the opening in the downward extension of the boom for the safety chain.

Also shown in FIG. 6 is the safety chain 62 stored within downward extension 24. Downward extension 24 is a hollow tubular member, preferably made of steel, and because it is hollow, extension 24 is used as a storage compartment for chain 62. The safety chain 62 exits through a key-shaped opening 78 shown well in FIG. 11. The key-shaped opening 78 is positioned on the hitch ball 30 side of the downward extension 24, and substantially above the hitch ball 30. The opening 78 is large enough in one area to withdraw chain 62 as needed, or to put most of the chain 62 back into extension 24 as desired. A narrower open slot portion at the bottom of opening 78 allows for a link of the chain 62 to be placed vertically sideways (on edge) within the slot wherein the chain links on each side of the vertical link prevent the chain from slipping or being drawn in either direction through the narrow slot portion. In order to extract more chain 62 from extension 24, the vertical chain link must be lifted upward out of the slot into the upper larger diameter bore of the key-shaped opening 78 through which the chain 62 easily passes. In order to prevent the inadvertent passage of the chain 62, and most importantly to prevent the vertical link from bouncing upward out of the slot, a chain lock 80 shown in FIG. 6 and 11 is applied. Chain lock 80 is generally comprised of a U-shaped steel bar mostly contained with downward extension 24, with one end of the U-shaped bar extending into opening 78 and residing over the slot at a height which would prevent the lifting of a vertical link sufficiently high to remove it from the slot. The other end of the U-shaped bar extends through a close fit hole in the wall of extension 24 above opening 78 whereat a pushable head is applied. A compression spring 81 is applied between the pushable head and the exterior wall of extension 24, and thereby the lower end of the U-shaped bar is biased outward over the slot in opening 78. By pushing on the exposed head of lock 80, the lower end of the U-shaped bar over the slot is moved inward further within extension 24 and away from the slot of opening 78 sufficiently to allow removal of a vertical chain link from the slot. In FIG. 11, I show a cross bar welded to the chain 62 adjacent the hook so as to prevent the chain 62 from ever slipping fully inside the downward extension 24. Safety chain 62 is intended to support the hitch 18 of the trailer 16 should for whatever reason the hitch 18 disengage from the tow hitch 12 at hitch ball 30. The connection of the chain 62 to the boom is centered and above the trailer hitch arm 18, and this position is ideal should the chain 62 be required to support the weight of the trailer hitch arm 18, and this is due to the chain 62 extending downward to adjacent hitch ball 30 and then connecting to hitch arm 18 wherein the chain 62 will maintain the hitch arm 18 upward and centered adjacent the itch ball should the hitch arm 18 ever disconnect from the hitch ball 30.

Figure 7:
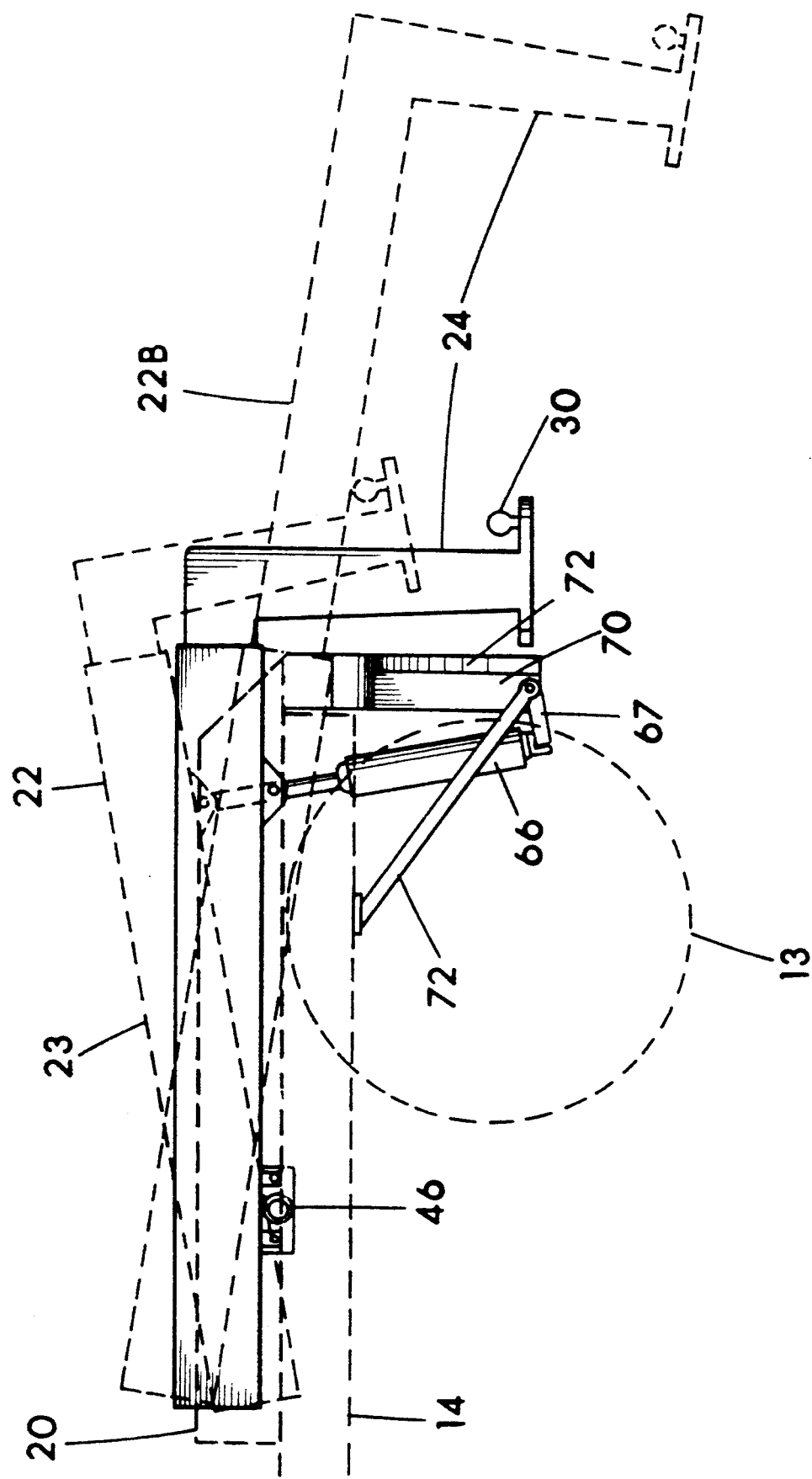
FIG. 7 is a partial side view of my hitch primarily to show the movement capabilities of the boom to raise up and down, and to telescope inward and outward, and thus to change length.

Referring now mainly to FIGS. 4 and 7 where a hydraulic ram 66 is shown. Ram 66 is used to lift and lower boom 23 vertically, pivoting the boom on bearing 46. The ram 66 is attached at the upper end thereof to the center of the lengthwise axis of boom section 22 A. The upper end of ram 66 is attached toward one end of section 22 A of the boom opposite from bearing 46. The lower end of the ram 66 is attached in this example using a mounting bracket 67 to lock housing 70. Lock housing 70 is securely attached to cross member 68 which in-turn is attached to or is a part of hitch frame 20. Lock housing 70 will be described in detail later. Each end of ram 66 is pivotally attached, and I use spherical bearings similar to bearing 46 at the connecting yokes of the rams in order to achieve the multi-directional pivoting necessary for the ram 66 to follow lateral movements of boom 23 where the ram 66 leans from its lower attachment to follow the boom 23 when swinging left or right. The vertically oriented ram 66 when lifting or lowering boom 23 also changes angle slightly, leaning toward and away from bearing 46.

As shown in FIG. 4, hitch ball 30 is attached to the lower end of downward extension 24 via a horizontally disposed extending plate 76 welded across the bottom end of extension 24. Hitch ball 30 is attached to the top extending surface of plate 76 as shown in FIG. 4. A rearward continuation of plate 76, designated lock pin receiver 74 extends toward lock housing 70. Plate 76 and lock pin receiver 74 are a single heavy gage steel plate, and this provides in essence an extremely strong and direct locking arrangement between the hitch ball 30 and lock housing 70 when the ball 30 and boom are in the locked position as will be appreciated with continued reading. Lock pin receiver 74 is beveled or cut at an angle at its distal end, angling inward from each lateral side toward the center to define a blunt point, and this being in order to render a somewhat self-guiding centering arrangement as the lock pin receiver 74 is inserted into openings 108 of lock housing 70. Extending vertically through lock pin receiver 74 is a lock pin receiver hole 75 through which a lock pin 114 is inserted within lock housing 70 when boom 23 is in the locked position.

Figure 8:
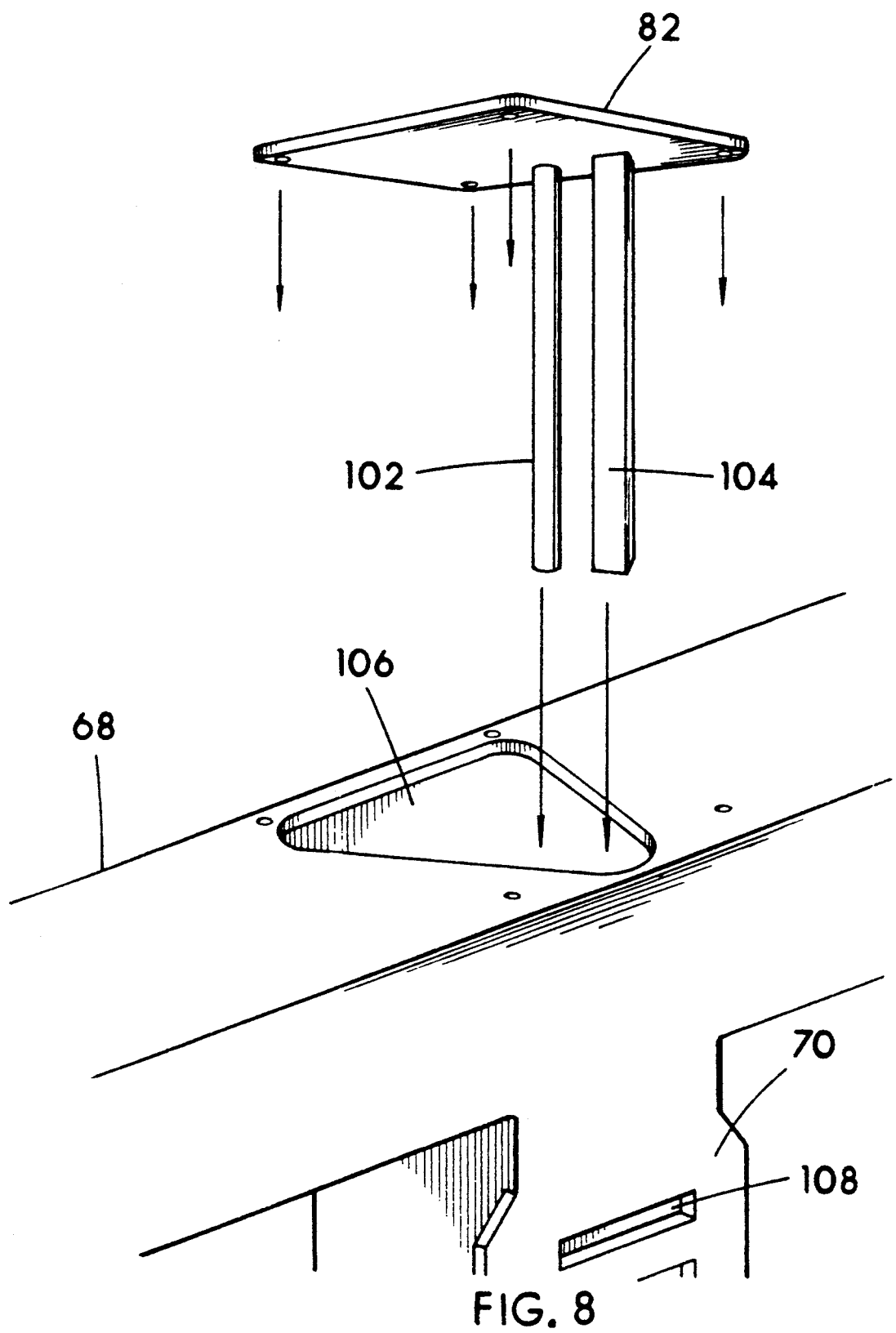
FIG. 8 is a view of some of the parts used in the boom and hitch ball lock.
Figure 9:
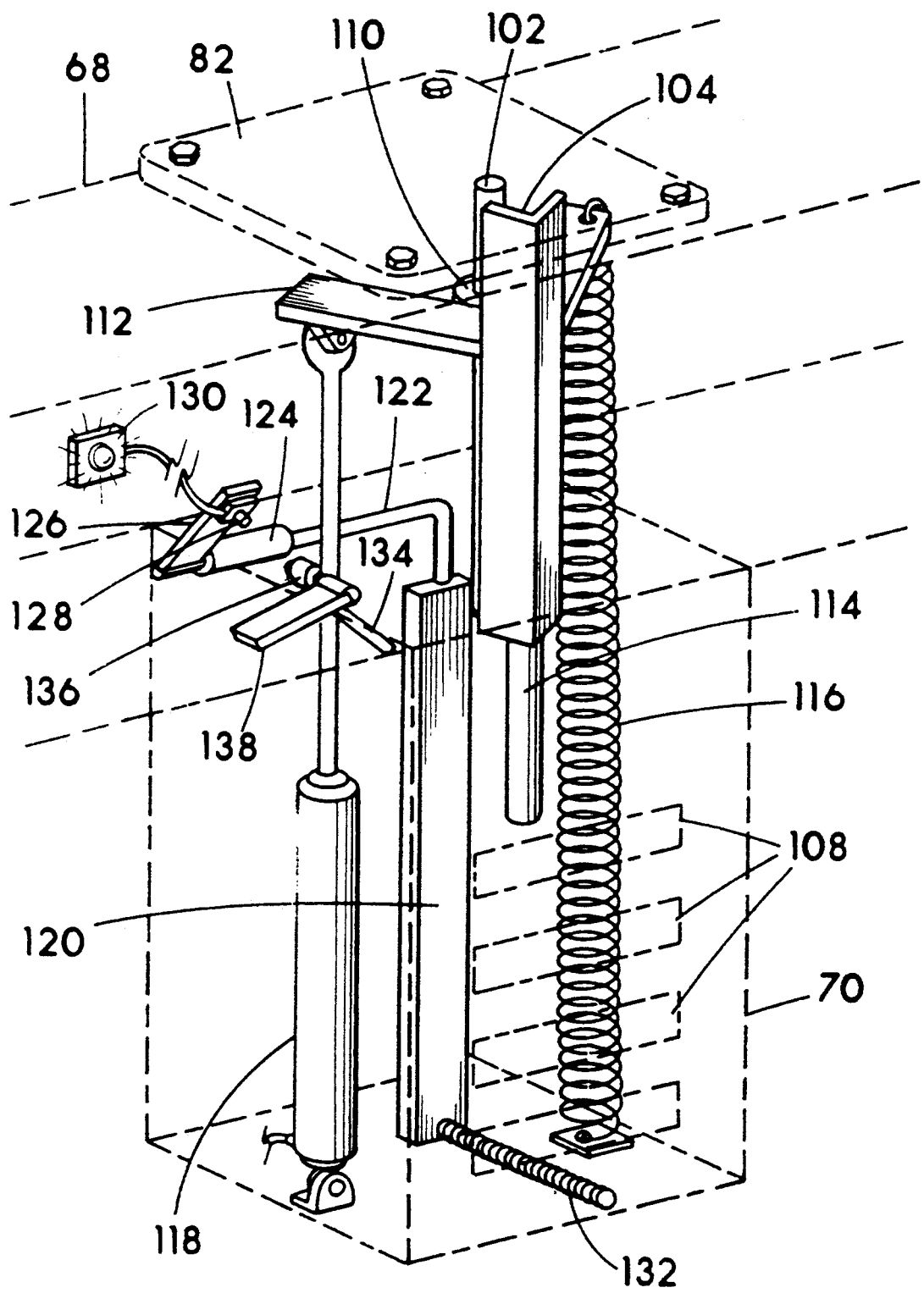
FIG. 9 is a view of the primary components of the present boom and hitch ball lock. A lock pin rod is shown in the up or unlocked position.
Figure 10:
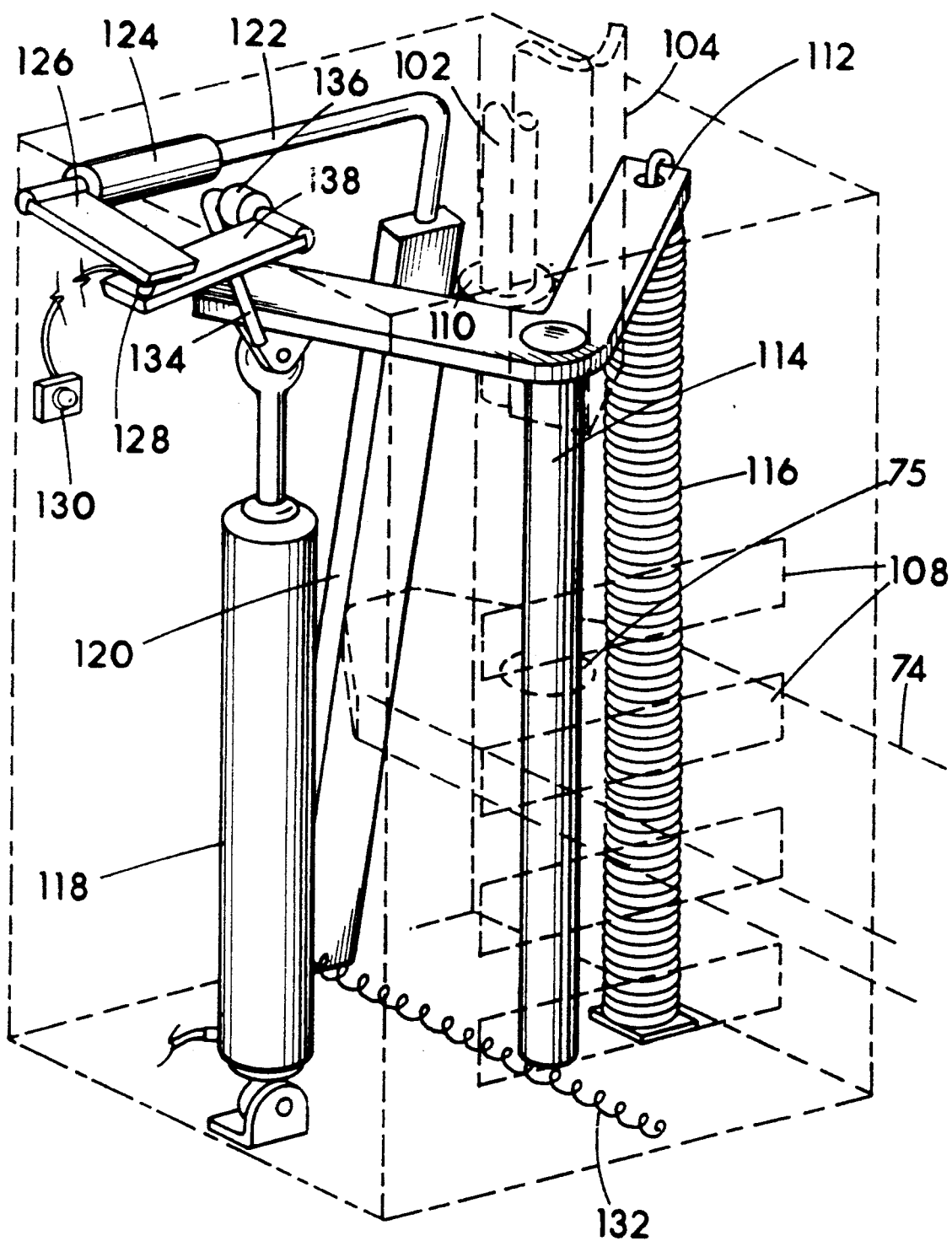
FIG. 10 is a view of the primary components of the present boom and hitch ball lock. The lock pin is in the down or locked position.

Lock housing 70 is essentially a hollow metal box securely attached to the underside cross member 68 which in-turn is attached to or is a part of hitch frame 20. Lock housing 70 is centered relative to the hitch main frame 20, and is positioned at what I consider the rear end of the hitch 12, as this end corresponds with the rear end of the truck 10. Lock housing 70 is preferably braced with multiple braces 72 which may be connected to the bottom of lock housing 70 and extend upward to attach to main frame 20 and to truck frame 14. The lock components within lock housing 70 may be accessed through an access plate 82 bolted over an opening 106 in the top center of cross member 68. An opening in the bottom of cross member 68 opens into the open top end of lock housing 70 as may be ascertained from FIG. 9. In this example of the invention, the face of lock housing 70 closest to lock pin receiver 74 has four openings 108 each sized to accept pin receiver 74. The openings 108 are positioned at various heights, one opening 108 over the other, so as to allow the locking of boom 23 and hitch ball 30 at a variety of heights as desired, depending on the height at which the trailer hitch 18 of trailer 16 rests relative to hitch 12. In order to lock boom 23 and hitch ball 30, pin receiver 74, using the powered movement capabilities of the hitch 12, is insert into one of the openings 108 of lock housing 70. The locking components within lock housing 70 in this example are shown best in FIGS. 8, 9 and 10, and include lock pin 114. Lock pin 114 is a round steel rod vertically disposed within housing 70. Lock pin 114 is securely attached at its upper end by welding to a horizontally disposed L-shaped plate 112. Lock pin 114 is positioned centered with openings 108 so as to be insertable through lock receiver hole 75 when lock pin receiver 74 in fully inserted into any of the holes 108. The bottom distal end of lock pin 114 is unattached, as it is insertable through lock receiver hole 75 of lock pin receiver 74. Lock pin 114 and L-shaped plate 112 are supported so as to be able to move upward and downward together, with downward being a position which inserts pin 114 through hole 75 and thus locks boom 23 and hitch ball 30, and upward is a position which allows the movement of lock pin receiver 74 in and out of lock housing 70, and thus is the unlocked position. In order to stabilize and guide the upward and downward movement of L-shaped plate 112 and thus lock pin 114, access plate 82 has an attached round rod guide pin 102 and an adjacent angle iron guide member 104. Guide member 104 extends downward from the underside of plate 82 and fits against the outside center 90 degree corner of L-shaped plate 112. Guide pin 102 extends downward from the underside of plate 82 and is slidably fitted into a guide and stabilizing sleeve 110. Both guide pin 102 and guide member 104 terminate at the lower ends upward above the highest hole 108 so as to not interfere with lock pin receiver 74 entering or leaving an opening 108 in housing 70. Sleeve 110 is attached by welding to the interior corner of a horizontally disposed L-shaped plate 112 as may be ascertained from FIGS. 9 and 10. L-shaped plate 112 and lock pin 114 may be vertically raised with a hydraulic lifting ram 118 mounted within housing 70, and the slidable engagement of plate 112 against the corner of guide member 104 coupled with the stability provided by guide rod 102 within sleeve 110 render the up and down movement of plate 112 and lock pin 114 secure against lateral movement. Lifting ram 118 is connected at one end thereof to one end of horizontal L-shaped plate 112, and at the bottom end thereof to the bottom plate of housing 70 and off to one side of openings 108. With the stabilizing guidance of the guide members 102 and 104, ram 118 can raise lock pin 114 upward above the upper most opening 108. A vertically disposed extension spring 116 is attached to the bottom plate of housing 70 with the upper end of the spring 116 attached to the L-shaped plate 12, opposite the attachment of ram 118 thereto. Spring 116 is also attached off-center and out of the way so as not to interfere with lock pin receiver 74 entering and leaving housing 70. Spring 116 is arrange to bias lock pin 114 downward, and thereby lock pin 114 may be drawn and held in the downward locked position without the use of any power other than the biasing effect of the spring 116. Ram 118 is sufficiently strong to over-power spring 116 and lift lock pin 114. In this example, ram 118 is a single acting ram capable of extending under power, and has no powered retraction abilities, as extension spring 116 forces the ram to retract when a hydraulic valve is opened to allow the exit of fluid from ram 118. The locking or dropping of lock pin 114 is automatic in this example of the invention. In order to provide the automatic dropping of lock pin 114, I use a commercially available hydraulic fluid pressure sequencing valve 140 in conjunction with a solenoid fluid control valve 142 for feeding fluid to both lifting rams 66 and 118. The controls for all rams will be detailed later, but in this situation, when an electric control switch of a control station 26 is momentarily actuated to cause lift in ram 66 and thus boom 23, hydraulic fluid pressure first builds slightly in ram 66 and the sequencing valve 140 then immediately opens the fluid line to ram 118 of the lock system. This causes the lifting of lock pin 114, and allows the operator to extend the boom section 22 outward with the use of another control switch for controlling ram 100. Upon the operator activating the control switch to move boom 23 downward via retracting ram 66, the sequencing valve 140 opens to allow the exiting of fluid from ram 118 and the extended spring 116 pulls lock pin 114 into the downward or locked position. When the boom 23 and hitch ball 30 are in the locked position with lock pin 114 through lock receiver hole 75, and it is desire to reposition the hitch ball 30 relative to the back of the truck, the operator momentarily activates a control switch which applies fluid to ram 66 to lift the boom. This in turn via valve 140 causes ram 118 to lift. The operator then toggles another control switch to extend boom 23 outward. To park and lock boom 23 and hitch ball 30, the operator using the control switches, guides lock pin receiver 74 into the opening 108 of his choice, and in doing so, when lock pin receiver 74 is fully in an opening 108, the operator momentarily applies downward pressure to ram 66 which then causes ram 118 to deactivate and to allow the full insertion of lock pin 114 into lock receiver hole 75 via pressure from spring 116. If the lock pin 114 is in the downward position and blocking the entrance of lock pin receiver 74 into openings 108, the operator aligns the lock pin receiver 74 with an opening 108, and then momentarily applies upward or lifting pressure to ram 66, which if done only momentarily, will not cause ram 66 to raise, but will cause the sequencing valve 140 to open and allow fluid under pressure to cause extending in ram 118 and thus the lifting of lock pin 114. The operator may then fully position lock pin receiver 74 within an opening 108, and then with a momentary actuation in downward fluid pressure applied to ram 66, the sequencing valve 140 opens into another position to allow the release of pressured fluid from ram 118 at which time the extended spring 116 draws lock pin downward through lock receiver hole 75.

In order to allow the operator to know positively that the lock pin 114 is inserted through receiver hole 75, I utilize a sensing system which activates and deactivates an electric light 130 within the cab of the truck 10. When the light 130 is lit, the boom is unlocked, and when the light 130 is off, the boom and hitch ball 30 are locked into lock housing 70. The lock sensor arrangement which I use for sensing whether lock pin 114 and fully dropped through lock receiver hole 75 includes two moveable members and an electric switch 128 within lock housing 70. The switch 128 is attached to a small movable flat plate 126 which in turn is attached to an L-shaped round rod 122. The rod 122 passes through a tube 124 which is welded to the interior of lock housing 70, and rotatably supports the rod 122. A downward end of the rod 122 is attached to an upper end of a vertically disposed flat plate 120. The plate 120 is positioned somewhat toward the far side of housing 70 away from opening 108. The plate 120 is long enough, and positioned so that the tip of lock pin receiver 74 will press against the plate 120 when the receiver 74 is fully in any of the opening 108, or in other words, when the lock receiver hole is positioned so as to receive lock pin 114. Plate 120 is movable, having clear space behind it so it may be pushed back somewhat. The bottom end of plate 120 is connected only to one end of a return extension spring 132. The spring 132 is attached at one end thereof to housing 70 below the lower most opening 108, and the spring 132 biases the plate 120 toward opening 108. The rod 122 attaches to the top end of plate 120, and the plate 120 is suspended or held by spring 132 and rod 122 so that lock pin receiver 74 when entering an opening 108, the plate 120 is pushed away from the openings 108 and loading spring 132. The pushing away of plate 120 causes rotation of about a quarter turn in plate 126 which is attached at a perpendicular angle to rod 122. The movement in plate 126 equates to movement of the attached switch 128 toward a switch anvil 138. Switch 128 is a push button switch, being a normally closed single pole switch in this example. The switch button is aligned and aimed toward the switch anvil 138. The switch button, is moved toward the anvil 138 upon the pushing of plate 120, but this movement is insufficient to allow the switch button of switch 128 to be pressed against the anvil 138, and in this situation, the lock indicating light 130 would still remain lit, indicating that the lock pin 114 is not in the downward position. It is possible that under very rare conditions, lock pin 114 might "hang-up" and not pass through lock receiver hole 75 even when plate 120 has been pushed against and all other steps have been taken to lock the boom 23 and hitch ball 130. Because of this unlikely but dangerous possibility, and anvil plate 138 must be moved toward the already moved switch 128 prior to the light 130 being deactivated. The switch anvil 138 is simply a flat plate of steel attached perpendicularly to a second L-shaped rod 134. Rod 134 is retained by a tube 136 welded to the interior of lock housing 70. The rod 134 is rotatably retained by the tube 136. An extending end of the rod 134 angles outward and lies in the lower most path of the L-shaped plate 112 which supports lock pin 114. When the plate 112 and thus lock pin 114 are fully downward, and only when fully downward, the plate 112 presses against the extending end of rod 134, and this causes the anvil 138 to move due to the rotation in the rod 134. The weight of anvil 138 is sufficient to reposition the end of rod 134 back upward when plate 112 is positioned upward and disengaged from rod 134. The movement of the anvil 138 when the end of rod 134 is pressed by plate 112 is toward the switch 128, and between the switch 128 moving toward the anvil 138 with the pushing of plate 120, and the anvil 138 moving toward the switch 128 with the full lowering of L-shaped plate 112 and lock pin 114, the anvil 138 presses against the button of the switch 128 and the electrical circuit through the switch 128 is opened and the light 130 is deactivated to positively indicate that the lock pin 114 is through the lock receiver hole 75. In order to deactivate the light 130, the plate 120 must be pressed by the tip of lock pin receiver 74, and the lock pin 114 and L-shaped plate 112 must be fully downward, and the only way this can occur, is if lock pin 114 is through lock receiver hole 75. This sensor system allow the operator to positively know the boom 23 and hitch ball 130 are mechanically lock in place in lock housing 70, and that a very heavy trailer 16 may be towed with little possibility of the trailer delatching at high speed and applying tremendous stresses to the hitch 12. The locking system is a direct mechanical lock, steel to steel, to secure boom 23 and hitch ball 30 in place in lock housing 70, and this relieves all of the hydraulic rams from trying to hold tremendous weights and pressures associate with towing trailers such as mobile homes. Lock pin 114 will remain in the down or locked position even with a loss of all electrical power and hydraulic fluid pressure.

Figure 12:
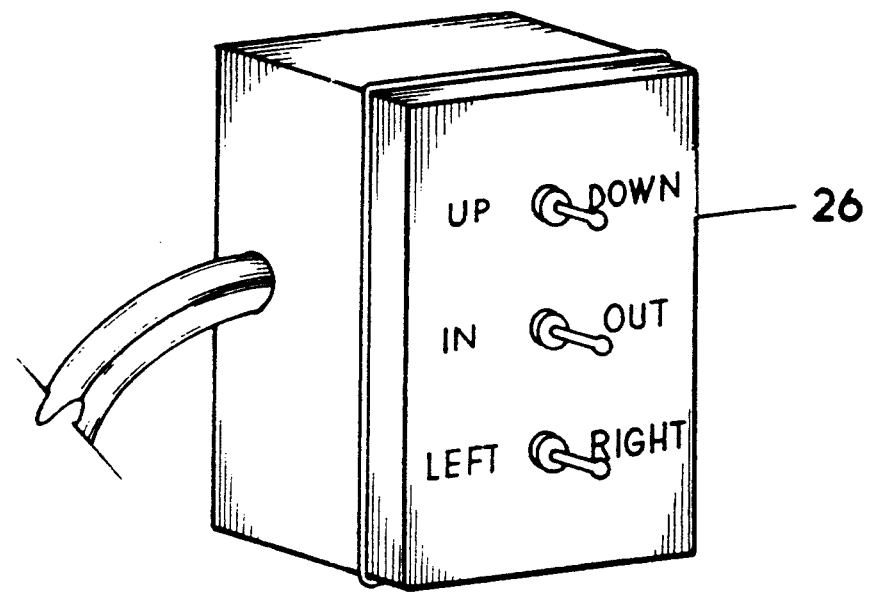
FIG. 12 is a view the control station which is mounted on the frame of the hitch toward the rear side of the truck in FIG. 1.
Figure 13:
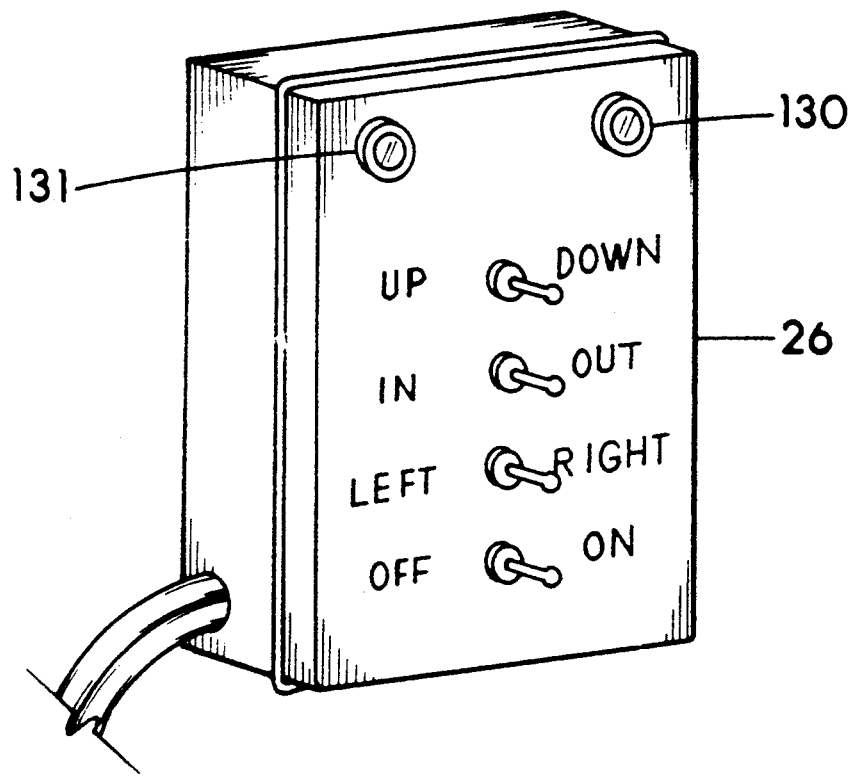
FIG. 13 is a view of a second control station which would be mounted within the cab of the transport truck.

In the example of the present invention, the powering of hydraulic rams 42, 66, 100, and 118 is supplied by a hydraulic fluid pumping station 64 attached to frame 20 toward cross member 21 and on the opposite side of boom 23 from support arm 32 as shown in FIG. 4. In order to render my hitch 12 simple and quick to install, the hydraulic fluid pumping station 64 is powered by a small electric motor which is powered from the electrical system of the truck 10. Hitch 12 is preferably supplied with color coded wiring harnesses for easy connection to the available electrical wiring systems which are always available on transport trucks for towing trailers, and thereby hitch 12 is relatively self-contained and simple and quick to install. The hydraulic fluid pumping station 64 supplies pressured fluid to a plurality of electric solenoid controlled fluid valves 142 in addition to the sequencing valve 140. One of the solenoid valves 142 supplies fluid to valve 140 which is simply a fluid control valves which responds to fluid pressures. Ram 42 has its own solenoid valve 142, as does ram 100. One solenoid valve 142 is used to supply fluid to valve 140 which in turn directs fluid to ram 66 and lock lift ram 118. The solenoid valves 142 are connected to electric switches which are arranged to open and close the valves 142 and thus allow the operator to control movement in the hitch 23 as he desires. The electric control switches are preferably placed in two grouped areas or stations 26, see FIG. 12 and 13. One station 26 is mounted to the hitch frame 20 on the side of the truck 10, and the second control station 26 is mounted within the cab of the truck 10 within reach of the driver. The station 26 mounted to the frame 20 and shown in FIG. 12 includes three self-centering switches, with the top switch being the up and down control switch for the boom 23, which equates to controlling ram 66. The middle switch is the inward and outward extension and retraction of the telescopic section 22 of the boom, and controls ram 100. The bottom switch is the right and left movement control switch for moving the boom 23 laterally, and controls ram 42. In FIG. 13, the control station 26 which mounts within the truck cab is shown. The cab control station 26 includes the equivalent of the same three control switches as the station 26 mounted on the hitch frame 20, and in addition includes a power on/off switch which may be used to disconnect the electrical power to the hitch hydraulic fluid pumping station 64 and the control station 26 on the hitch frame 20 in order to prevent tampering with by unauthorized persons. The cab control station 26 additionally includes the indicator light 130 for the lock system, and an indicator light 131 which lights when the electrical system of the hitch 12 is activated via the power on/off switch of the station. The solenoid valves 142 may be activated simultaneously with one another if the operator manipulates more than one movement control switch at a time, and thereby hitch movements can be combined if desired so as to allow angular simultaneous vertical, lateral and extending or retracting movements to occur at once and thereby the operator is provided with significant ability to precisely move the trailer 16 relative to the rear end of the truck 10.

Shown in FIG. 1, and indicated in FIG. 4 is a protective cover 28. The cover 28 includes four hooks 29, one hook 29 at each corner, and which are engagable with hitch main frame 20 to retain the cover 28 removably in place. The cover 28 when in place is positioned over brace 54 and over the area thereunder which might provide a location having pinch spots where a person's arm or hand might possibly get smashed with movement of the boom 23. The cover 28 additionally somewhat covers hydraulic fluid pumping station 64 and thereby somewhat protects it from the whether.

Although I have very specifically described the preferred structures of my hitch for towing a trailer, it should be understood that the specific details are given for example to those skilled in the art. Many changes in the specific structures described may clearly be made without departing from the scope of my invention, and therefore it should be understood that the scope of the invention is not to be limited by the specification and drawings given for example, but is to be determined by the spirit and intended scope of the appended claims.

What I claim as my invention is:

1. A power operated hitch mountable to a truck for towing a trailer, said hitch including a main support frame structured for mounting to a back frame section of the truck and for supporting a hitch boom, said boom having an elongated generally horizontally disposed section, and a generally vertically disposed downward extension connected to the horizontally disposed section of said boom, a main bearing pivotally supporting the horizontally disposed section of said boom on said main support frame, said bearing adapted to support said boom in a manner as to allow lateral and vertical changes in said boom relative to said main support frame, a support arm affixed to the horizontally disposed section of said boom in the area of the pivotal supporting of said boom by said bearing, track means supported by said main support frame for providing movement of said support arm, said support arm extending from the horizontally disposed section of said boom with a distal end of said support arm slidably retained in said track means, means in communication with said support arm for preventing upward and down movement force in said distal end of said support arm upon vertical change in the horizontally disposed section of said boom relative to said main support frame, said track means structured to permit horizontal sliding movement of said distal end of said support arm, said track means further structured to prevent substantial vertical movement of said distal end of said support arm and thereby add overall stabilizing strength to said boom, a hitch ball attached to a downward distal end of said downward extension, said hitch including first powering means and controls means for said first powering means for providing vertical changes in said boom and thus said hitch ball relative to said main support frame, said hitch including second powering means and controls means for said second powering means for providing lateral changes in said boom and thus said hitch ball relative to said main support frame.

2. A power operated hitch mountable to a truck in accordance with claim 1 further including the horizontally disposed section of said boom including telescopic means for allowing inward and outward movement of said hitch ball relative to said main support frame; and further including third powering means and controls means for said third powering means for providing powered inward and outward movement of said hitch ball relative to said main support frame.

3. A power operated hitch mountable to a truck in accordance with claim 2 further including said downward extension being a hollow structure containing a safety chain stored therein, said downward extension including an opening providing means for allowing the withdrawing of a length of said chain as desired, said downward extension further including a releasible chain locking means for preventing undesired withdrawing of said chain from said downward extension.

4. A power operated hitch mountable to a truck in accordance with claim 3 further including an electrical outlet means attached to said downward extension for providing means for powering trailer brakes and lights.

5. A power operated hitch mountable to a truck in accordance with claim 4 further including a semi-automatic lock means for mechanically locking said boom and hitch ball stationary relative to said main support frame, said semi-automatic lock means including biasing means for positioning and retaining a lock pin through a pin receiver attached to said downward extension adjacent said hitch ball.

6. A power operated hitch mountable to a truck for towing a trailer, said hitch including a main support frame structured for mounting to a back frame section of the truck and for supporting a hitch boom, said boom having an elongated generally horizontally disposed telescopic section, and a vertically disposed downward extension connected to an end of the telescopic section of said boom, a main bearing pivotally supporting the telescopic section of said boom, said bearing supported by a main support shaft with said main support shaft connected to said main support frame, said bearing adapted to support the telescopic section of said boom in a manner as to allow lateral and vertical changes in said boom relative to said main support frame, a support arm affixed to the telescopic section of said boom in the area of the pivotal supporting of said boom by said bearing, said support arm extending from the telescopic section of said boom generally perpendicularly, a distal end of said support arm slidably retained in a channel supported by said main support frame, said channel structured to permit horizontal sliding movement of said distal end of said support arm, said channel further structured to prevent substantial vertical movement of said distal end of said support arm and thereby add overall stabilizing strength to said boom, means in communication with said support arm for preventing upward and down movement force in said distal end of said support arm upon vertical change in the telescopic section of said boom relative to said main support frame, a hitch ball attached to a downward distal end of said downward extension, said downward extension further being a hollow structure containing a safety chain stored therein, said downward extension including an opening providing means for allowing the withdrawing of a length of said chain as desired, said downward extension further including a releasible chain locking means for preventing undesired withdrawing of said chain from said downward extension, an electrical outlet means attached to said downward extension for providing means for powering trailer brakes and lights, said hitch including first powering means and controls means for said first powering means for providing inward and outward telescopic movement of the telescopic section of said boom, said hitch further including second powering means and controls means for said second powering means for providing vertical changes in said boom and thus said hitch ball relative to said main support frame, said hitch including third powering means and controls means for said third powering means for providing lateral changes in said boom and thus said hitch ball relative to said main support frame.

7. A power operated hitch mountable to a truck for towing a trailer, said hitch including a main support frame structured for mounting to a back frame section of the truck and for supporting an elongated hitch boom, said boom having an elongated generally horizontally disposed telescopic section, and a vertically disposed downward extension connected to an end of the telescopic section of said boom, a main spherical bearing pivotally supporting the telescopic section of said boom, said spherical bearing supported by a horizontally disposed main support shaft with said main support shaft connected to said main support frame, said spherical bearing adapted to support the telescopic section of said boom in a manner as to allow lateral and vertical changes in said boom relative to said main support frame, the telescopic section of said boom attached relative to said main support frame so as to be generally raised above the truck frame when mounted on a truck and with said downward extension outward beyond a rear end of the truck, a support arm affixed to the telescopic section of said boom in the area of the pivotal supporting of said boom by said spherical bearing, said support arm extending from the telescopic section of said boom generally perpendicularly, a distal end of said support arm slidably retained in a channel supported by said main support frame, said channel structured to permit horizontal sliding movement of said distal end of said support arm, said channel further structured to prevent substantial vertical movement of said distal end of said support arm and thereby add overall stabilizing strength to said boom, means in communication with said support arm for preventing rotational force from being applied to said distal end of said support arm upon vertical changes in the telescopic section of said boom relative to said main support frame, means in communication with said support arm for preventing upward and down movement force in said distal end of said support arm upon vertical change in the telescopic section of said boom relative to said main support frame, a hitch ball attached to a downward distal end of said downward extension, said downward extension providing means for supporting said hitch ball at a relatively low height while having the horizontally disposed telescopic section of said boom positioned relatively high when on the truck, said downward extension further being a hollow structure containing a safety chain stored therein, said downward extension including an opening providing means for allowing the withdrawing of a length of said chain as desired, said downward extension further including a releasible chain locking means for preventing undesired withdrawing of said chain from said downward extension, an electrical outlet means attached to said downward extension for providing means for powering trailer brakes and lights, said hitch including first powering means and controls means for said first powering means for providing inward and outward telescopic movement of the telescopic section of said boom, said hitch further including second powering means and controls means for said second powering means for providing vertical changes in said boom and thus said hitch ball relative to said main support frame, said hitch including third powering means and controls means for said third powering means for providing lateral changes in said boom and thus said hitch ball relative to said main support frame, said hitch including a semi-automatic lock means for mechanically locking said boom and hitch ball stationary relative to said main support frame, said semi-automatic lock means including biasing means for positioning and retaining a lock pin through a pin receiver attached to said downward extension adjacent said hitch ball.

8. A power operated hitch mountable to a truck in accordance with claim 7 wherein said spherical bearing is centrally positioned relative to the width across said main support frame and thereby equal left and right lateral movements in said boom are allowed.

9. A power operated hitch mountable to a truck for towing a trailer, said hitch including a main support frame structured for mounting to a back frame section of the truck and for supporting a generally L-shaped hitch boom, said boom including an elongated generally horizontally disposed section supported in use vertically upward above the truck frame and in close proximity to the truck frame, said boom further including a generally vertically disposed downward extension connected to the horizontally disposed section of said boom, said downward extension having an affixed hitch ball positioned vertically downward below the horizontally disposed section of said boom and below the truck frame when said main support frame is attached to the truck frame so that said hitch ball is positioned in use at approximate normal trailer hitch arm height at a rear end of the truck;

movable means in connection with said boom for allowing inward and outward horizontal movement of said hitch ball relative to said main support frame;

a main bearing pivotally supporting the horizontally disposed section of said boom on said main support frame, said bearing including means for supporting said boom in a manner as to allow pivotal lateral and vertical changes in said boom relative to said main support frame, said hitch including first powering means and controls means for said first powering means for providing vertical changes in said boom and thus said hitch ball relative to said main support frame, said hitch including second powering means and controls means for said second powering means for providing lateral changes in said boom and thus said hitch ball relative to said main support frame, said hitch including third powering means and controls means for said third powering means for providing powered inward and outward horizontal movement of said hitch ball relative to said main support frame.

* * * * *